Dec. 30, 1952      E. MARTIN      2,623,598
ROTOR SPEED GOVERNOR
Filed March 1, 1945      6 Sheets-Sheet 1
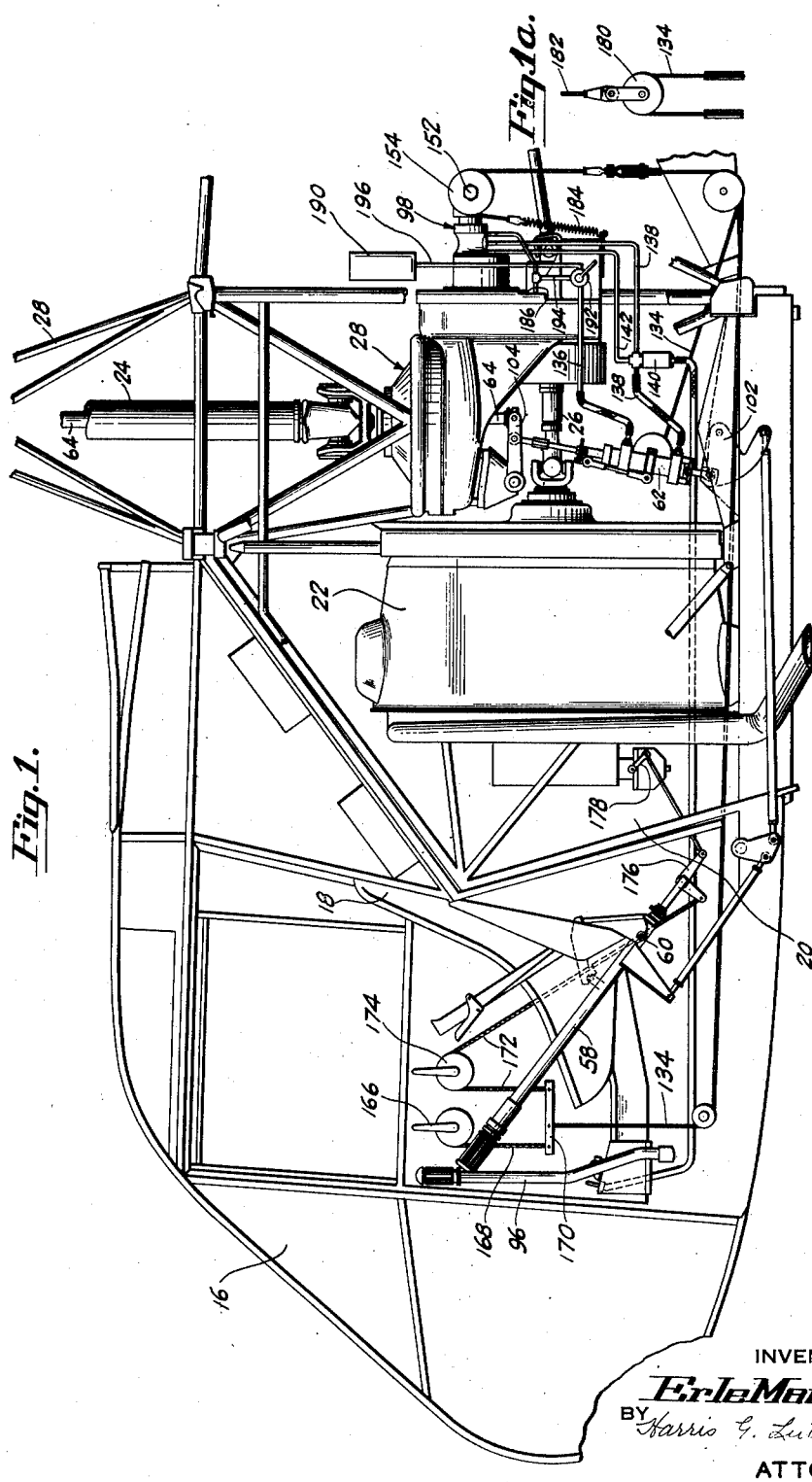
INVENTOR
Erle Martin
BY Harris G. Luther
ATTORNEY

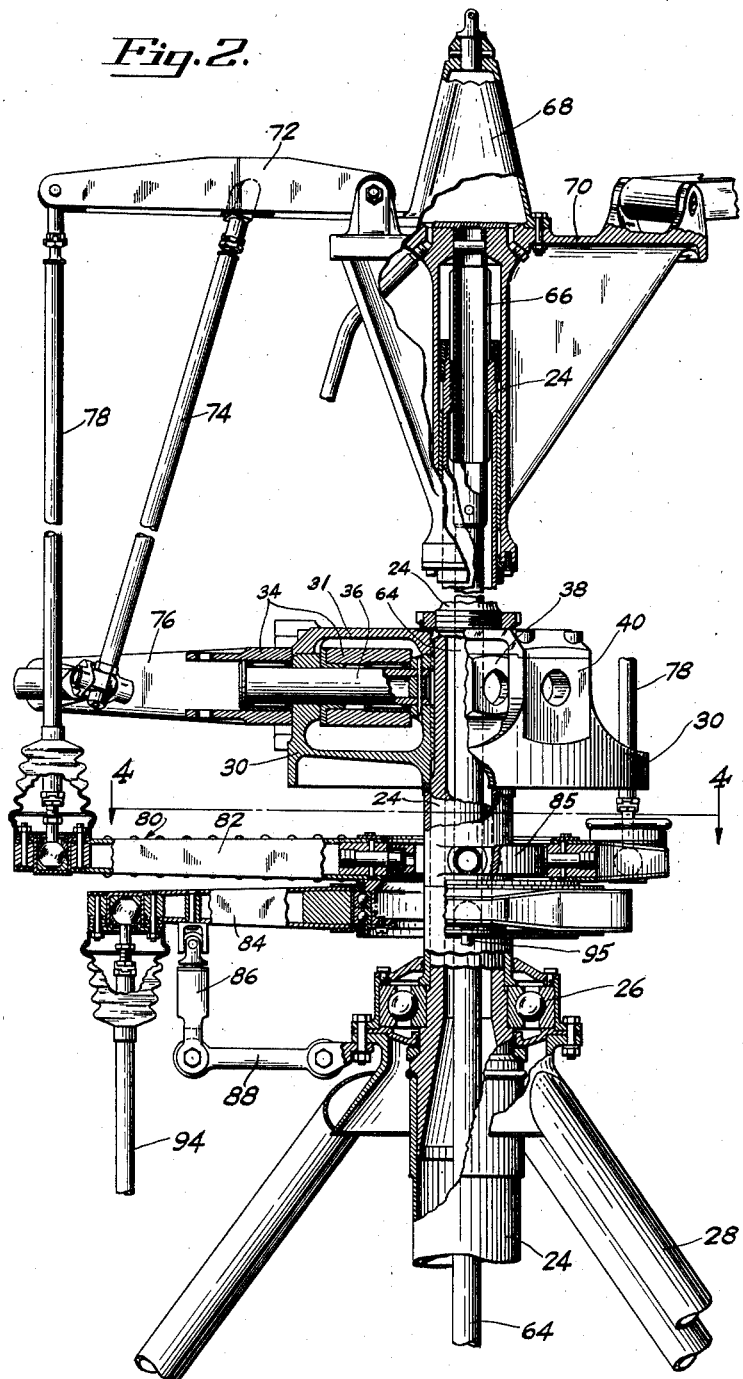

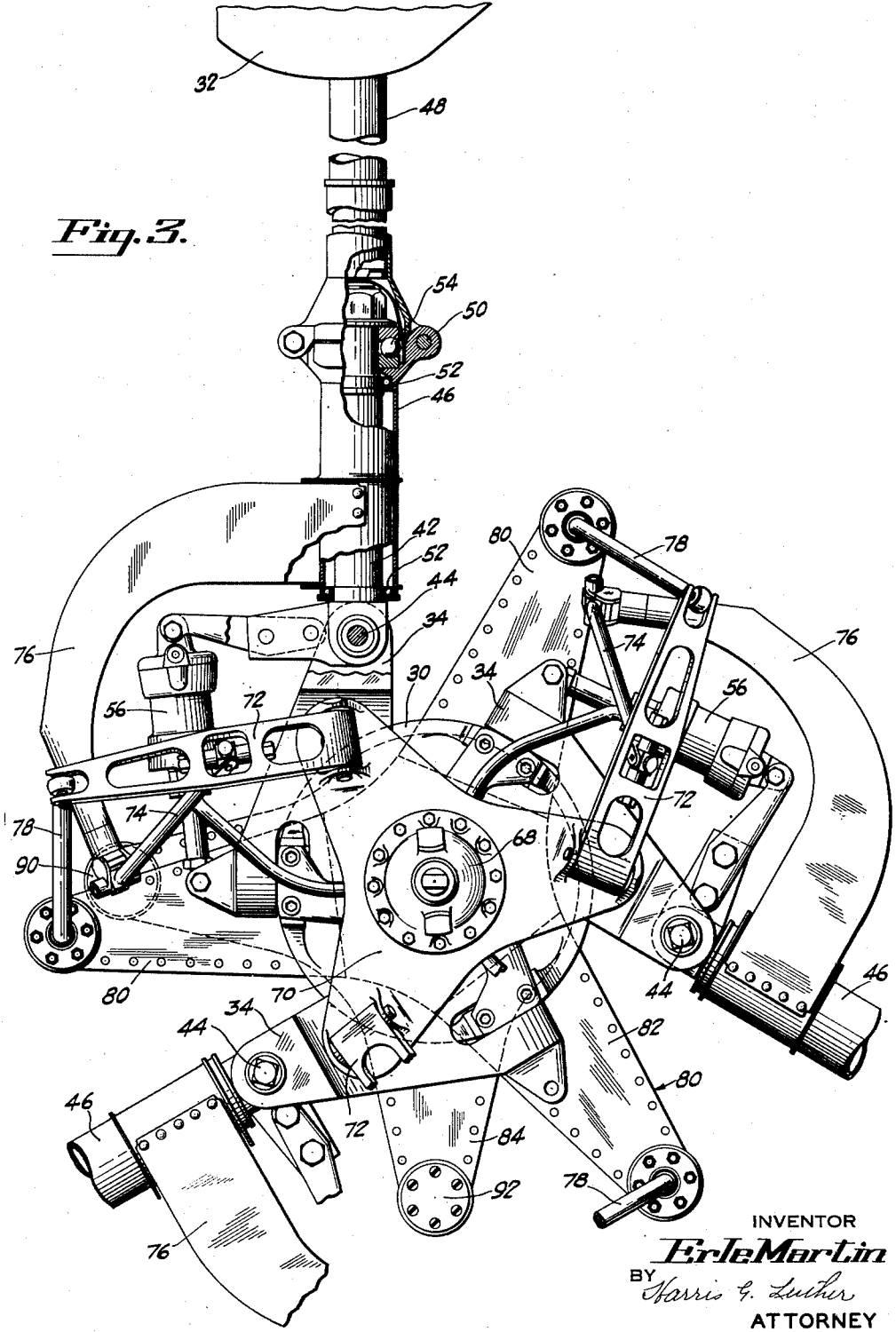

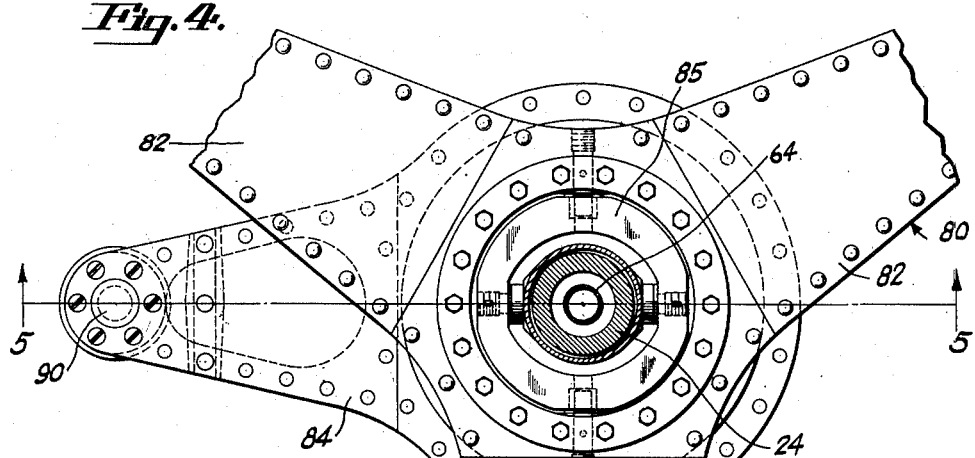
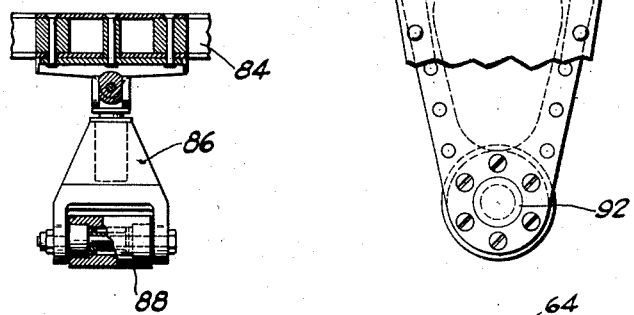
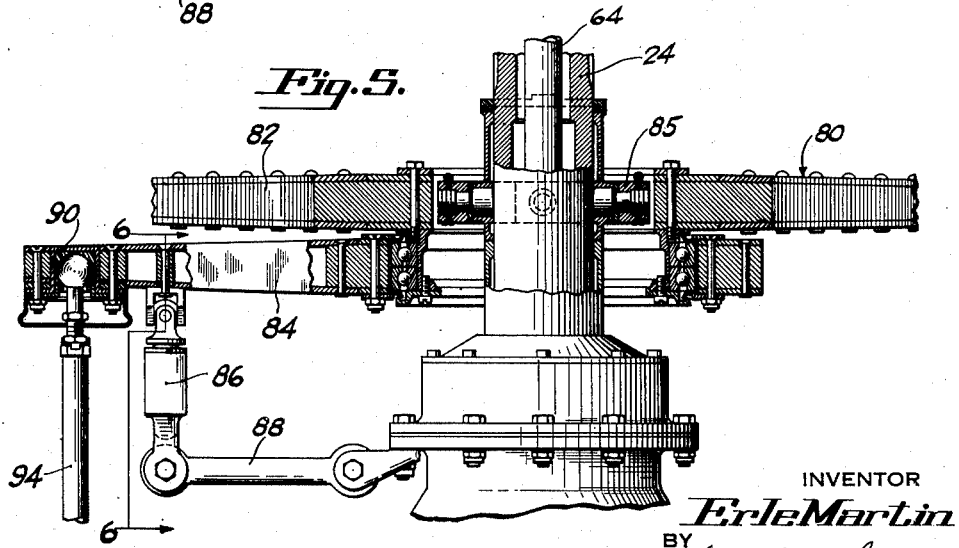

Dec. 30, 1952 E. MARTIN 2,623,598
ROTOR SPEED GOVERNOR
Filed March 1, 1945 6 Sheets-Sheet 5
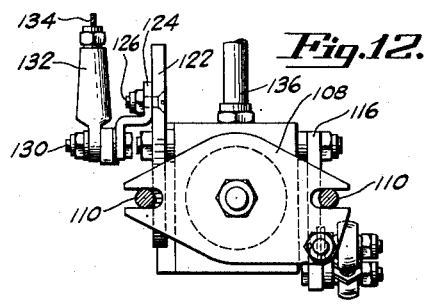
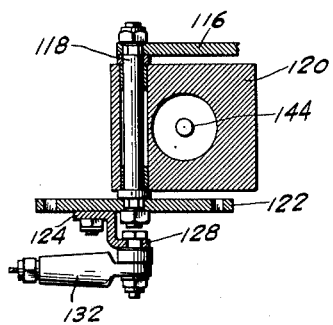
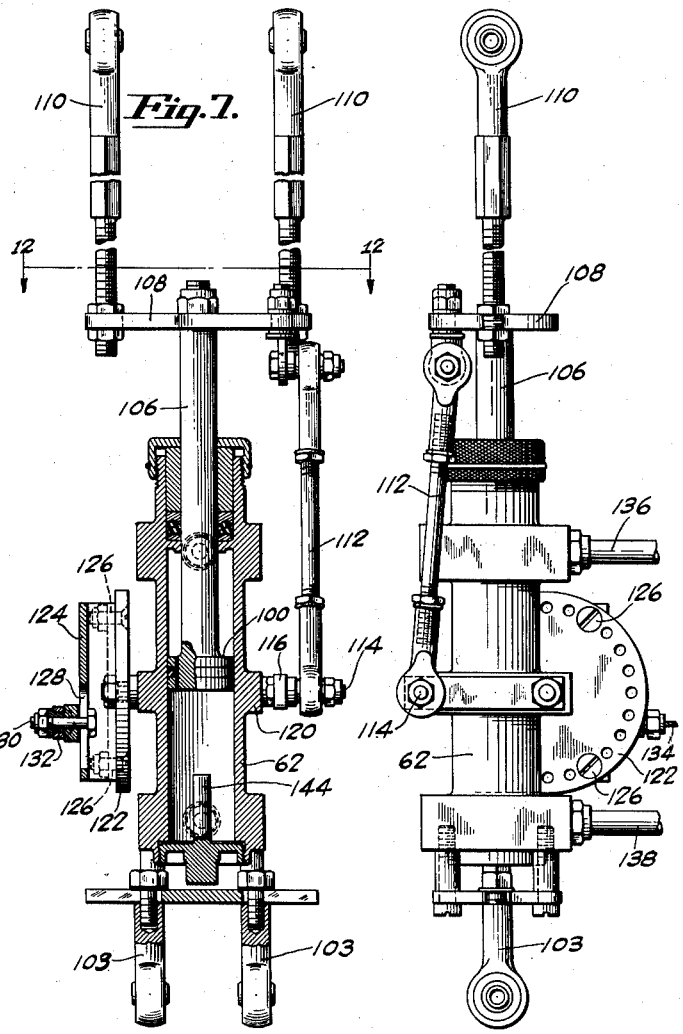
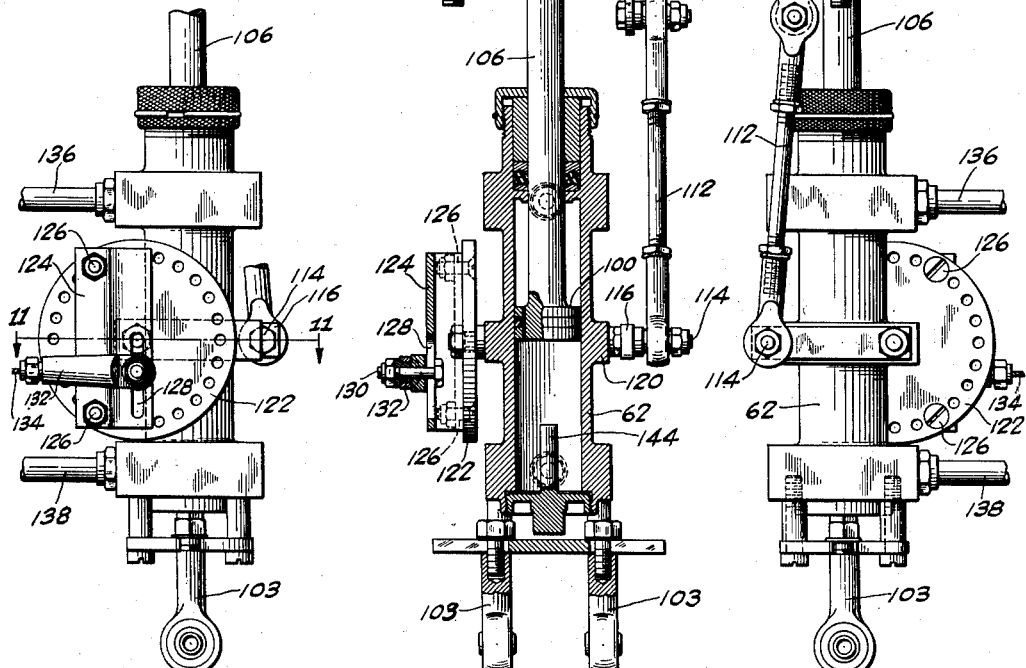
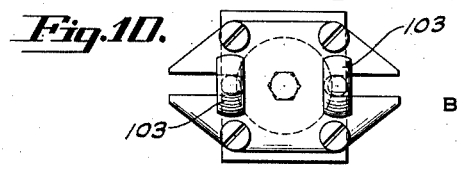
INVENTOR
*Erle Martin*
BY *Harris G. Lucher*
ATTORNEY Dec. 30, 1952  E. MARTIN  2,623,598
ROTOR SPEED GOVERNOR
Filed March 1, 1945  6 Sheets-Sheet 6

INVENTOR
*Erle Martin*
BY *Harris G. Luther*
ATTORNEY

Patented Dec. 30, 1952

2,623,598

UNITED STATES PATENT OFFICE 2,623,598

ROTOR SPEED GOVERNOR

Erle Martin, West Hartford, Conn., assignor to United Aircraft Corporation, East Hartford, Conn., a corporation of Delaware Application March 1, 1945, Serial No. 580,462

13 Claims. (Cl. 170—135.74)

This invention relates to helicopters and the control thereof and more particularly to a governor control for a helicopter rotor.

An object of this invention is a practical governor control for a helicopter sustaining rotor.

Another object is a compensating mechanism for a governor controlled helicopter sustaining rotor providing adequate control without objectionable hunting.

Another object is a helicopter control in which the throttle control also performs the function of the main pitch control.

Other objects and advantages will be apparent from the specification and claims and from the accompanying drawings which illustrate what is now considered to be a preferred embodiment of the invention.

In the drawings, Fig. 1 is a side elevation of a helicopter, a portion of the fuselage being broken away, showing the rotor controls.

Fig. 1A is a detail of the cable and pulley arrangement for operating the governor speed setting mechanism.

Fig. 2 is a side elevation of the rotor head with a portion broken away to more clearly show the construction.

Fig. 3 is a top elevation of the rotor head.

Fig. 4 is a top elevation of the pitch controlling wobble plate shown with the relatively movable parts in a different position from that shown in Fig. 3.

Fig. 5 is a section on line 5—5 of Fig. 4 of the wobble plate with parts in full.

Fig. 6 is a partial sectional view on line 6—6 of Fig. 5.

Fig. 7 is a front elevation partly in section of the operating motor for the main pitch control.

Fig. 8 is a side elevation of the left hand side of the operating motor.

Fig. 9 is a side elevation of the right hand side of the operating motor.

Fig. 10 is a bottom view of the operating motor showing the means for connecting the operating motor to the manual control for the main pitch.

Fig. 11 is a section taken on the line 11—11 of Fig. 9.

Fig. 12 is a section taken on the line 12—12 of Fig. 7.

Figure 13:
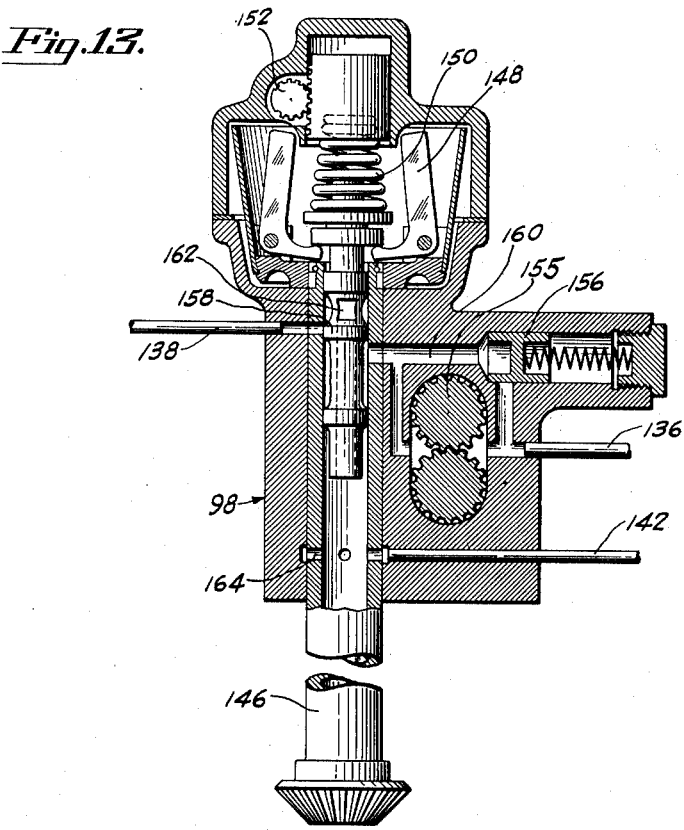
Fig. 13 is a partially schematic control sectional view through the governor.
Figure 14:
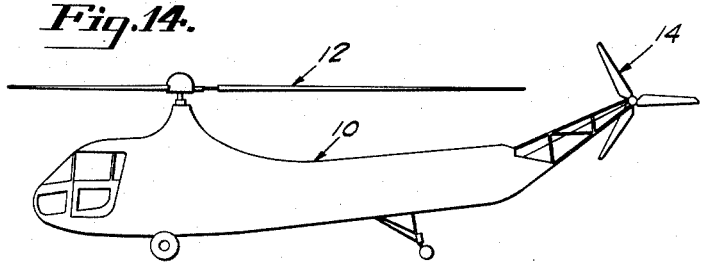
Fig. 14 is a schematic view showing the general arrangement of the helicopter.

In the drawings the helicopter fuselage is generally indicated at 10, the main rotor at 12, and the auxiliary rotor at 14. In the forward part of the fuselage, a pilot's compartment 16 contains the pilot's seat 18 and the various controls for the helicopter. Engine compartment 20 is located to the rear of the pilot's compartment and contains an air-cooled radial engine 22 driving a rotor shaft 24 and the auxiliary rotor through a short drive shaft 26 and a reduction gear indicated generally at 28. The rotor drive shaft 24 is supported adjacent its upper end in a bearing 26 carried by a pylon framework 28 which is supported on the framework of the fuselage.

Splined to the upper portion of shaft 24 is a rotor hub 30 on which rotor blades 32 are pivotally mounted. Shaft 24 continues on through hub 30 and acts as a guide for a vertically movable platform carrying pitch changing mechanism and shock absorber oil supply which will be described later. Rotor blade 32 is pivotally connected to hub 30 as follows. A link 34 is pivoted for vertical oscillation about a horizontal pivot pin 36 carried by hub 30 in bosses 38 and 40. Hub cap 31 provides additional support for boss 40. Shaft 42 is connected to link 34 by a vertical pivot pin 44. Shaft 42 carries a sleeve 46 which is connected to shank 48 of blade 32 by a releasable hinge 50. Sleeve 46 surrounds the shaft 42 and is retained thereon by bearings 52 and 54. Movement of the rotor blade about the pin 36 accommodates flapping and coning movements; movement about the pin 44 accommodates drag-induced movements; and movement of the rotor blade about the shaft 42 accommodates pitch changing movements.

The pitch changing mechanism comprises a cyclical pitch control and a total pitch control. The cyclical pitch control acts to increase the propeller pitch in one portion of its circular path and simultaneously decrease the pitch in the circular path at a point 180° away, and the main pitch control acts to simultaneously and equally increase or decrease the pitch of all the blades.

The main pitch control is operated by a lever 58 pivoted at 60. This lever is connected through linkages, including a servo cylinder 62, which will be described later, to a pitch control rod 64 mounted inside hollow shaft 24. Pinned to the upper end of the shaft 64 is a splined sleeve 66 which, in turn, is pinned to an oil reservoir 68 mounted on platform 70. Vertical motion of shaft 64 will, therefore, cause vertical motion of the platform 70. Pivoted on the platform 70 are arms 72, one for each rotor blade, carrying rods 74 connecting each arm 72 with a pitch changing horn 76 secured to a propeller blade. Rod 78 is pivotally connected at one end to the outer end of arm 72 and at the other end to the cyclical pitch changing wobble plate generally indicated at 80. As long as wobble plate 80 remains in a fixed position, movement of the platform 70, up or down, will produce a simultaneous and equal pitch change in all of the rotor blades.

The wobble plate 80 comprises two relatively movable parts 82 and 84 universally mounted on the shaft 24 by gimbals 85. One portion of gimbals 85 is fixed with respect to shaft 24 and the other portion is fixed with respect to part 82 rotatable with shaft 24. Part 84 of the wobble plate 80 is fixed against rotation by links 86 and 88 pivoted to the stationary housing for bearing 26. The tilting of the wobble plate 80 is determined by a pair of control rods 94 and 95 pivotally mounted in part 84 at 90 and 92, respectively. The control rods are connected by suitable linkage, not shown, to the control stick 96 in the pilot's compartment. The connection between the stick 96 and the control rods is omitted to simplify the drawings as the linkage is the well known type in which movement from side to side of the control stick will move one of the control rods and fore-and-aft movement of the control stick will move the other control rod. It is clear from the showing in Fig. 2 that tilting of the wobble plate will cause movement of rods 78 which will turn arms 72 on their pivotal connection to the platform 70 and will thus move rods 74 and change the rotor blade pitch.

Movement of rotor blades 32 about their pivots 44 is damped by shock absorbers 56, there being one shock absorber for each blade. Any deficiency of fluid in the shock absorbers is automatically replenished from the storage reservoir 68.

The mechanism thus far described is a manually controlled helicopter in which lateral movements and fore-and-aft movements are controlled by the control stick 96, yawing movements are controlled by pitch changes in the auxiliary rotor 14 (not described) and vertical movements are controlled by the main pitch control and the throttle. In the structure illustrated, a connection, bell-crank 176, is provided between the main pitch control lever 58 and the throttle control linkage so that movement of lever 58 to increase the rotor pitch will also open the throttle. Applicant has discovered that it is possible to control the helicopter without the use of the main pitch control by suitably incorporating a speed governor which will control the rotor speed by changing the pitch thereof. In this manner it becomes possible to control the vertical movements of the helicopter by throttle adjustments alone, the transverse movements being controlled in the usual manner by the control stick 96. Elimination of the main pitch control eliminates one of the controls required in flight and thus makes for an improved and simpler helicopter.

In the embodiment shown in the accompanying drawings, a governor, generally indicated at 98, is mounted on and driven from reduction gear 28 and controls a servo mechanism including a cylinder 62 which is incorporated in the linkage between the pitch control lever 58 and the pitch control rod 64 in such a manner that movement of the servo piston 100 in the cylinder 62 changes the length of the linkage, thus moving control rod 64 and changing the total pitch of the rotor. While the helicopter is being controlled by the governor, the main pitch control lever is held in a fixed position. In the embodiment shown, the weight of the pitch changing mechanism, including the rod 64, platform 70, arms 72, etc., together with the usual friction in the controls is sufficient to hold the control lever 58 in the position illustrated. Mechanical means for locking the control lever 58 in position are not illustrated but may be provided, if desired.

The servo mechanism is shown in detail in Figs. 8, 9, 10, 11, and 12 and forms the link connecting the bell crank 102 with lever 104 in the main pitch changing linkage. Cylinder 62 is connected at one end to one leg of bell crank 102 by rods 103. A cross bar 108 carries rods 110 at its ends and is secured midway between its ends to piston rod 106. This construction permits the linkage to straddle the shaft 26. Each of the rods 110 connects with one of a pair of levers 104 fixed at one end to the reduction gearing and pivoted at the other end to the pitch changing rod 64. A connecting rod 112 is pivotally connected at one end to cross bar 108 and is pivoted at the other end on crank pin 114 carried by crank arm 116. A shaft 118 is rotatably mounted in a square boss 120 located about midway between the ends of servo cylinder 62. This shaft passes from one side to the other of cylinder 62 and carries the crank arm 116 at one end and a crank disc 122 at the other end. A Z plate 124 is adjustably mounted on crank disc 122 by means of bolts 126 so that a slot 128 in one arm of the Z plate extends substantially radially from the center of crank disc 122. A bolt 130 is adjustably mounted in the slot 128 and pivotally carries a cable end connection 132 for one end of cable 134. The intermediate portion of cable 134 passes over a pulley connected with the governor setting mechanism and the other end of cable 134 is connected to a governor control lever by means hereinafter described. Movement of the piston 100 acting through the mechanism just described will reset the governor for each change in propeller pitch, thus providing governor compensation by speed droop.

Piston 100 is actuated hydraulically by fluid led to the top of the piston through line 136 or fluid led to the bottom of the piston through line 138. In the modification shown, oil, under pressure, is continuously supplied through the line 136 and line 138 is connected through governor 98 either with a higher pressure source or drain, depending upon the desired direction of movement of the piston 100. A solenoid actuated valve 140 is inserted in the line 138 and in one position has no effect on that line; but in its energized position, acts to block the connection between the servo cylinder 62 and governor 98 and connect the servo cylinder with a drain through line 142. Energization of solenoid valve 140 will, therefore, cause the servo piston 100 to move downward in cylinder 62 until it rests against stop 144, thus hydraulically locking the servo piston and, in effect, making the connection between bell crank 102 and lever 104 a link of fixed length. Under these conditions, control lever 58 may be operated in the usual manner to vary the pitch of the rotor and control the helicopter, the governor control then being completely eliminated.

The governor, shown in Fig. 13, comprises a drive shaft 146 having a gear connection with a drive gear in reduction gear 28 and driving the governor flyweights 148 in timed relation with the rotor. Speeder spring 150 may be manually set by rotation of shaft 152 and pulley 154 (Fig. 1) to select the desired governor setting. A booster pump 155, schematically shown in Fig. 13, is driven from drive shaft 146 and serves to boost the pressure of the fluid introduced through line 136 to the governor pressure determined by the relief valve 156. Governor valve 158 is mounted for reciprocation in hollow drive shaft 146 and acts to connect line 138 either with fluid under pressure in line 160 or, through the vent 162, the interior of valve 158, and the interior of shaft 146 with a drain. Line 142 connects by means of ports 164 with the interior of shaft 146 and thus with a drain to the interior of the reduction gear housing.

The governor may be set for any selected speed by means of a lever or quadrant 166. Cable 168 has one end secured to quadrant 166 and the other end secured to one end of a cross bar 170. One end of cable 134 is secured to a point intermediate the ends of cross bar 170. Cable 172 has one end secured to the other end of cross bar 170 and passes over an adjustable pulley 174 and has its opposite end secured to one leg of a bell crank 176 carried by control lever 58. The other leg of bell crank 176 is connected to throttle lever 178. Movement of wheel 174 will adjust the throttle of the engine and simultaneously cause movement of cable 134 to reset the governor. Cable 134 passes over a pulley 180 supported by a cable 182 which passes over governor adjusting pulley 154. Spring 184 will move cable 182 and pulley 180 in one direction when cable 134 is slacked away. Tightening of cable 134 will move cable 182 in the opposite direction, thus providing a governor adjustment. Following through the various cable connections, it will be seen that the governor setting may be adjusted by means of the governor control lever, or quadrant, 166 and that opening or closing of the throttle serves to reset the governor. Furthermore, movement of the servo piston 100 to change the rotor pitch will also reset the governor. It has been found that connecting these cables so that an increase of rotor pitch will reset the governor for a higher speed and so that an opening adjustment of the engine throttle will reset the governor to a lower speed will produce satisfactory results.

The extent of this resetting may be adjusted by a movement of the point of attachment of connection 132 to the Z plate 124 and by adjustment of the point of attachment of cable 134 to cross bar 170.

In order to maintain satisfactory control over the speed of a helicopter rotor, I have found that it is necessary to provide compensating mechanism, otherwise, due to the slow speed and large mass of the rotating rotor, the governor will overshoot and consequently hunt. By properly adjusting connection 132, the governor speed setting will be changed by a change in pitch, thus providing compensation so that undesirable hunting may be substantially eliminated. By the above described connection between the servo piston and the governor setting mechanism, which will effect a speed droop upon each pitch reduction, the governor setting is changed to reset it closer to the actual speed of the rotor upon each pitch change so that overshooting is prevented and hunting is completely eliminated or reduced to an unobjectionable quantity. For example, if the rotor is rotating faster than the speed called for by the governor, the servo motor will be moved to increase the rotor pitch to slow the rotor speed. Such increase of pitch will reset the governor for a higher speed. Hence, with the rotor slowing down from its high speed and the governor setting increasing toward said high speed, an intermediate point of equilibrium is reached, at which the change of pitch is stopped before the pitch has changed so far that overshooting will result.

Opening the throttle in a governor controlled helicopter will, because of the resulting increase in torque, normally cause an increase in the rotor pitch to provide a greater load to prevent an increase in speed. The increase in pitch will actuate the speed droop compensating mechanism and reset the governor to a higher speed setting. Thus, a different speed is obtained at each different pitch setting. In some installations it may be found that the speed droop compensation gives a high speed at high pitch greater than desired and a low speed at low pitch less than desired. Under such conditions the throttle lever may be connected in, as described above, so as to change the governor setting with each change in throttle setting and thus substantially reduce the total amount of this speed droop. By connecting the throttle to the governor speed setting mechanism, as above, so that opening the throttle will reset the governor to a lower speed and connecting the pitch changing mechanism to the governor speed setting mechanism so that an increase in pitch (which will follow as the rotor tends to pick up speed due to the increased engine power and the pitch is increased by the governor to hold the speed down) will reset the governor to a higher speed, and properly proportioning the connections, a structure may be provided in which substantially no change in the governor setting will finally result, although a throttle change has been made. Such an arrangement will give substantially constant rotor speed over substantially the entire throttle opening range.

The above described structure either with or without the throttle compensation may be utilized as a safety device to reduce the blade pitch and place the blades in position for autorotation if the rotor speed should drop below a preselected minimum. This may be accomplished by adjusting the governor speed setting mechanism to a speed value below the normal desired rotor speed, for instance, setting the governor for 260 R. P. M. in a machine where the normal rotor speed is 270 R. P. M., and then adjusting the manual pitch control to obtain the normal speed. Under such conditions, the governor will try to increase the rotor pitch to reduce the rotor speed and will thus extend the servo mechanism, including piston 110 and servo cylinder 62, to its full extent and maintain the servo mechanism extended as long as the rotor speed remains above the governor speed setting. If, however, the rotor speed should drop below the selected minimum, then the governor will act to immediately reduce the rotor pitch; and if the loss of rotor speed is caused by, say, motor failure, the pitch will be reduced automatically to the autorotation position.

Under some conditions, it may be found desirable to supply fluid through line 136 faster than it can normally be supplied by the pump in the reduction gear housing. Under such conditions, line 136 may be disconnected from the line 186 leading from the reduction gear housing to the governor and may be connected with an accumulator 190 containing fluid under the desired pressure which will supply fluid to the servo motor at the desired pressure and rate. A valve 192 in the junction of lines 136, 194 and 196 serves to either connect line 136 with line 194 and block its connection with line 196 or connect line 136 with line 196 and block its connection with line 194.

It is to be understood that the invention is not limited to the specific embodiment herein illustrated and described, but may be used in other ways without departure from its spirit as defined by the following claims.

I claim:

1. In a helicopter having a rotor with blades mounted for pitch adjusting movement, means for manually simultaneously adjusting the pitch of all the blades of said rotor including manually actuatable means and a control connection connecting said blades and said manual means, a piston and cylinder device forming a part of said control connection and bodily movable by said manual means, and a governor driven in timed relation with said rotor and connected with said piston and cylinder device to control the pitch of said blades by controlling relative movement of said piston and cylinder to adjust the length of said connection.

2. In a helicopter having a rotor with blades mounted for pitch adjusting movement, means for simultaneously adjusting the pitch of all the blades of said rotor including a control rod, manually actuated means for moving said rod to change the pitch of said blades, a piston and cylinder device forming a part of said control rod and bodily movable by said manually actuated means, and a governor driven in timed relation with said rotor and connected with said device to control the pitch of said blades by controlling the length of said rod.

3. In a helicopter having a rotor with blades mounted for pitch adjusting movement, means for simultaneously adjusting the pitch of all the blades of said rotor including a control rod, manually actuated means for moving said rod to change the pitch of said blades, a piston and cylinder device forming a part of said control rod, and a governor driven in timed relation with said rotor and connected with said piston and cylinder device to control the pitch of said blades by controlling the effective length of said rod, and means for disconnecting said governor from said piston and cylinder device and moving said piston to one extreme of its movement whereby the automatic control is disabled but manual control is maintained.

4. Governor control means for a helicopter rotor having adjustable pitch blades, pitch adjusting means, including a governor having speed setting means and driven in timed relation with said rotor, a two part pitch adjusting motor controlled by said governor, an engine for driving said rotor, and a throttle for said engine, comprising in combination means for manually setting the governor, means operably connected to the governor and actuated by movement of said throttle for resetting said governor, and means actuated by movement of said motor for resetting said governor and means interconnecting said setting and resetting means.

5. Governor control means for a helicopter rotor having adjustable pitch blades, pitch adjusting means including a governor having speed setting means and driven in timed relation with said rotor, a pitch adjusting motor controlled by said governor, an engine for driving said rotor, and a throttle for said engine, comprising in combination means for manually setting the governor, means connected with said governor setting means and actuated by movement of said throttle for resetting said governor, and means also connected with said governor setting means and actuated by pitch changing movement of said rotor resulting from said throttle movement for returning the governor setting to substantially said manually selected setting.

6. A safety device for use with a helicopter rotor having a preselected normal speed and means for driving said rotor at said preselected speed comprising, a governor set to regulate at a rotor speed below said normal speed, means for driving said governor at a fixed ratio of said rotor speed, means having a limited range of movement and actuated by said governor for adjusting the rotor pitch, said means being held at one extreme of its movement when the rotor speed is maintained above the speed for which the governor is set and actuatable to reduce the rotor pitch upon a drop in rotor speed to a value below the speed for which the governor is set.

7. In a helicopter, a rotor, means for manually adjusting the pitch of said rotor, means for driving said rotor, and means for maintaining said rotor speed at a selected value, including means for adjusting said driving means and said means for adjusting said rotor pitch, mechanism forming a part of said manual pitch adjusting means for adjusting said pitch independent of the setting of said manual means, a governor set to regulate at a rotor speed lower than said selected speed, driven in timed relation with said rotor, and operatively connected with said adjusting mechanism to actuate the same.

8. In a helicopter, a rotor, means for manually adjusting the pitch of said rotor, means for driving said rotor, means for adjusting said rotor speed to a preselected operating speed, including means for adjusting said driving means, a governor set to regulate at a rotor speed lower than said selected speed, means for driving said governor in timed relation with said rotor, mechanism forming a part of said manual pitch adjusting means, having a limited range of movement and actuated by said governor for adjusting the rotor pitch, said means being held at one limit of its limited movement when the rotor speed is maintained above the speed for which the governor is set and actuatable to reduce the rotor pitch upon a drop in rotor speed to a value below the speed for which the governor is set.

9. A rotor speed governing system for a rotary wing aircraft having a variable pitch rotor, pitch-changing means for varying the pitch and lift of said rotor, a power means for driving said rotor, and a throttle for varying the power output of said power means, said governing system comprising a servomotor for actuating said pitch-changing means, a control device for controlling the direction of movement of said servomotor, means responsive to deviations in speed of said rotor from a control point speed for actuating said control device to cause movement of said servomotor and said rotor pitch-changing means in a direction to correct for said speed deviation, means responsive to movements of said throttle for causing actuation of said control device and a resulting movement of said servomotor and pitch-changing means in a direction to oppose a transient change in rotor speed which would otherwise occur due to the change in power output of said power means in response to movements of said throttle, and means responsive to movements of said servomotor and pitch-changing means for causing the actuation of said control device and the movements of said servomotor to be limited in accordance with the amounts of movement of said throttle.

10. A rotor speed governing system for rotary wing aircraft having a variable pitch rotor, pitch-changing means for varying the pitch and lift of said rotor, a power means for driving said rotor, and a throttle for varying the power output of said power means, said governing system comprising a servomotor for actuating said pitch-changing means, a control device for controlling the direction of movement of said servomotor, means responsive to deviations in speed of said rotor from a reference speed for actuating said control device to cause movement of said servomotor and said pitch-changing means in directions to correct for said speed deviations, means responsive to the positions of said pitch-changing means to change said reference speed of said speed responsive means in the direction of speed deviation to stabilize said governing system, and means responsive to the positions of said throttle to change said reference speed of said speed responsive means to compensate for changes of reference speed which occur due to the operation of said means responsive to positions of said pitch-changing means as said throttle is adjusted to change the power output of said power means.

11. In a helicopter having an engine, an engine throttle, a throttle control, a rotor, manually actuated pitch control means for controlling the pitch of said rotor, a pitch controlling connection between said manually actuated pitch control means and said rotor, throttle actuating means including said manually actuated pitch control and a throttle actuating connection between said pitch control and said throttle for automatically opening the throttle as the pitch is manually increased, a governor driven in timed relation with said rotor, and governor controlled pitch increasing means connected with said governor and said pitch controlling connection and coacting with said manually actuated means for increasing the rotor pitch to increase the load imposed on said engine as the rotor speed tends to increase due to increased power caused by said opening the engine throttle.

12. In combination, an adjustable pitch helicopter rotor, an engine for driving said rotor, speed selecting means for establishing the driven speed of said rotor at a manually selected value including, manually actuated power control means for manually controlling said engine power and manually actuated pitch control means for manually adjusting the pitch of said rotor, other pitch control means for automatically controlling the propeller pitch on loss of power comprising a governor, governor setting means set to control at a speed below said selected speed, and pitch control means actuated by said governor and operatively connected with said rotor pitch adjusting mechanism for automatically reducing the rotor pitch when the rotor speed is below said governor speed setting.

13. In a helicopter, a sustaining rotor having manually controlled power driven and automatically controlled autorotation pitch positions, power means for driving said rotor, rotor speed selecting means including manually actuated pitch varying and power control means for manually adjusting said rotor pitch and said power means, to power drive said rotor at a selected speed at a manually controlled power driven pitch position, rotor speed responsive means, speed setting means for said speed responsive means set to regulate at a rotor speed below said selected speed while said rotor pitch adjusting, and said power adjusting, means are set to select said selected speed, and pitch control means actuated by said speed responsive means for automatically reducing the pitch of said rotor and changing the rotor from a manually controlled power-driven position to an automatically controlled autorotation pitch position in response to a rotor speed below said regulating speed, and pitch control disabling means for preventing said pitch control means from changing said rotor pitch while the rotor is power driven at said selected speed.

ERLE MARTIN.

REFERENCES CITED

The following references are of record in the file of this patent:

UNITED STATES PATENTS

| Number | Name | Date |
|---|---|---|
| Re. 20,283 | Caldwell | Mar. 9, 1937 |
| 2,252,838 | Drake et al. | Aug. 19, 1941 |
| 2,317,342 | Pullin | Apr. 27, 1943 |
| 2,341,384 | Kalin | Feb. 8, 1944 |
| 2,350,126 | Pitcairn | May 30, 1944 |
| 2,352,736 | Richmond | July 4, 1944 |
| 2,364,116 | Whitehead | Dec. 5, 1944 |

FOREIGN PATENTS

| Number | Country | Date |
|---|---|---|
| 212,020 | Switzerland | Jan. 16, 1941 |
| 217,669 | Switzerland | Apr. 16, 1942 |
| 518,181 | Germany | Sept. 6, 1928 |
| 703,319 | Germany | Feb. 6, 1941 |